United States Patent
Tonami et al.

(10) Patent No.: US 8,449,796 B2
(45) Date of Patent: May 28, 2013

(54) METHOD OF MANUFACTURING LIGHT GUIDE AND METHOD OF MANUFACTURING A RADIATION DETECTOR

(75) Inventors: Hiromichi Tonami, Kyoto-fu (JP); Tomoaki Tsuda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 203 days.

(21) Appl. No.: 12/937,353

(22) PCT Filed: Apr. 14, 2008

(86) PCT No.: PCT/JP2008/057292
§ 371 (c)(1),
(2), (4) Date: Oct. 11, 2010

(87) PCT Pub. No.: WO2009/128135
PCT Pub. Date: Oct. 22, 2009

(65) Prior Publication Data
US 2011/0024023 A1    Feb. 3, 2011

(51) Int. Cl.
*G02B 6/10* (2006.01)
(52) U.S. Cl.
USPC ............ 264/1.24; 264/2.5; 264/161; 264/163
(58) Field of Classification Search
USPC ................. 264/1.24, 161, 162, 2.5, 219, 299, 264/37.3, 163; 156/267
See application file for complete search history.

(56) References Cited

U.S. PATENT DOCUMENTS

| | | | | | |
|---|---|---|---|---|---|
| 5,265,184 | A | * | 11/1993 | Lebby et al. | 385/132 |
| 5,540,799 | A | * | 7/1996 | Lebby et al. | 156/245 |
| 5,543,159 | A | * | 8/1996 | Iltgen | 425/543 |
| 6,309,576 | B1 | * | 10/2001 | Schwab | 264/161 |
| 7,019,298 | B2 | * | 3/2006 | Tonami et al. | 250/368 |
| 2004/0262527 | A1 | * | 12/2004 | Ooi | 250/368 |
| 2006/0043631 | A1 | * | 3/2006 | Lang et al. | 264/161 |
| 2006/0183395 | A1 | * | 8/2006 | Xu et al. | 445/50 |

FOREIGN PATENT DOCUMENTS

JP      2004-245592 A      9/2004

OTHER PUBLICATIONS www.dict.org (definitions of fluorescence and laminate).*

* cited by examiner

*Primary Examiner* — Christina Johnson
*Assistant Examiner* — David Schmerfeld
(74) *Attorney, Agent, or Firm* — Cheng Law Group, PLLC

(57) ABSTRACT

According to a method of manufacturing a light guide of this invention, a shaping member is provided that covers a molding frame. In a releasing step, when the shaping member is lifted up in a direction apart from the molding frame, the light guide is lifted and pulled out from an aperture of the molding frame accordingly. As a result, there is no need to pull out the light guide by conventionally providing a pressing plug on a bottom of the molding frame and pressing the plug in a direction. In addition, there is no need to perform a grinding process to the light guide.

16 Claims, 13 Drawing Sheets

METHOD OF MANUFACTURING LIGHT GUIDE AND METHOD OF MANUFACTURING A RADIATION DETECTOR

TECHNICAL FIELD

This invention relates to a method of manufacturing a radiation detector having a scintillator, a light guide, and a light detector that are optically coupled to one another in turn.

BACKGROUND ART

This type of radiation detector is used in emission computed tomography (ECT: Emission Computed Tomography) equipment to detect radiation (such as gamma rays) emitted from radiopharmaceutical that is administered to a subject and is localized to a site of interest for obtaining sectional images of the site of interest in the subject showing radiopharmaceutical distributions. Typical ECT equipment includes, for example, a PET (Positron Emission Tomography) device and an SPECT (Single Photon Emission Computed Tomography) device.

A PET device will be described by way of example. The PET device has a detector ring with block radiation detectors arranged in a ring shape. The detector ring is provided for surrounding a subject, and allows detection of gamma rays that are transmitted through the subject.

Such radiation detector arranged in the detector ring of the PET device is often equipped that allows position discrimination in a depth direction of a scintillator provided in the radiation detector for improved resolution. Particularly, such radiation detector is used, for example, in a PET device set for animals. FIG. 14 is a perspective view showing a construction of a conventional radiation detector. Such radiation detector 50 has scintillation counter crystal layers 52A, 52B, 52C, and 52D in which scintillation counter crystals 51 of rectangular solid are accumulated in two dimensions, and a fluorescence detector 53 with a function of position discrimination that detects fluorescence irradiated from each of the scintillation counter crystal layers 52A, 52B, 52C, and 52D. Here, each of the scintillation counter crystal layers 52A, 52B, 52C, and 52D is laminated in a z-direction to form a scintillator 52 that converts incident radiation into fluorescence. Two or more reflectors 54 are provided in each of the scintillation counter crystal layers 52A, 52B, 52C, and 52D.

A light guide 55 is provided between the scintillator 52 and the fluorescence detector 53 to optically connect the scintillator 52 and the fluorescence detector 53.

The light guide 55 has a solid resin through which fluorescence is transmitted. The solid resin includes inside thereof two or more reflectors 55a. The reflectors 55a are inserted in an aperture of a molding frame 60, and a liquid thermosetting resin 61 is poured into the molding frame 60, as shown in FIG. 15(a), for manufacturing the light guide 55. The thermosetting resin 61 is cured, and thereafter a pressing plug 62 provided in the bottom of the molding frame 60 is pushed in a direction toward the aperture of the molding frame 60 as indicated by an arrow. As a result, the light guide 55 is removed from the molding frame 60 as shown in FIG. 15(b). Subsequently, grinding is performed to both surfaces 63 and 64 of the light guide 55 through which fluorescence is transmitted. When both surfaces 63 and 64 of the light guide 55 is flat, both surfaces 63 and 64 are polished, whereby the light guide 55 is completed (see, for example, Patent Literature 1).
[Patent Literature 1]
Japanese Patent Publication No. 2004-245592

DISCLOSURE OF THE INVENTION

Problem to be Solved by the Invention

However, the conventional method of manufacturing a radiation detector has the following drawbacks. Specifically, manufacturing of the conventional light guide 55 necessarily requires a process of grinding both surfaces 63 and 64 of the light guide 55. Upon removal of the light guide 55 from the molding frame 60, one end face 63 of the light guide in the aperture of the molding frame 60 always has a depression shape, and thus is not planar, which prevents the light guide from optically connecting the scintillation counter crystal layer 52D and the fluorescence detector 53 under this state. The thermosetting resin 61 is a liquid when poured into the molding frame 60. Consequently, the thermosetting resin 61 protrudes upward and a meniscus 65 appears at an end of the aperture of the molding frame 60. The thermosetting resin 61 is to be cured while the meniscus 65 therein is kept in its shape. As a result, one end face 63 of the light guide is to have a depressed shape.

Moreover, upon removal of the light guide 55 from the molding frame 60, other end face 64 of the light guide in the bottom of the molding frame 60 has a circular bulge 66 formed thereon, and thus is not planar, which prevents the light guide from optically connecting the scintillation counter crystal layer 52D and the fluorescence detector 53 under this state. The molding frame 60 has the pressing plug 62 on the bottom thereof. Thus, when poured into the aperture of the molding frame 60, the thermosetting resin 61 penetrates so as to fill a gap between the molding frame 60 and the pressing plug 62. When the thermosetting resin 61 is cured under this state, a shape of a contact portion between the molding frame 60 and the pressing plug 62 is to be transferred on the other end face 64 of the light guide. Specifically, a circular bulge 66 is to be formed that shows a shape of the contact portion between the molding frame 60 and the pressing plug 62.

As mentioned above, the conventional configuration requires a process of grinding the both faces 63, 64 of the light guide 55. That is, the both face 63, 64 are not flat upon removal of the light guide 55 from the molding frame 60. Therefore, a radiation detector cannot be manufactured with no grinding process performed.

A grinding process is performed through rubbing of the light guide 55 against a rotor disk. The grinding process is, however, complicated. Thus, shortened grinding process may ensure ease of manufacturing a radiation detector, which results in cost reduction of the radiation detector. Moreover, in the grinding process, the possibility increases that a corner of the light guide 55 is fractured, or excess grinding is performed of the corner of the light guide 55. Considering from the light guide having a fractured corner that cannot be utilized as a product any more, the grinding process lowers manufacturing yield of the light guide.

This invention has been made regarding the state of the art noted above, and its object is to provide a method of manufacturing a radiation detector in which a light guide is manufactured with no grinding process performed thereto, whereby the possibility of fracturing a corner of the light guide is reduced to enhance manufacturing yield of the light guide, and a complicated grinding process is shortened to improve manufacture efficiency of the radiation detector for manufacturing a radiation detector of low price.

Means for Solving the Problem

This invention is constituted as stated below to achieve the above object. A method of manufacturing a light guide of this invention is a method of manufacturing a light guide provided in a radiation detector and allowing fluorescence to pass through. The method includes the steps of forming a lattice-like plate frame by fitting two or more first plates that extend along a first direction while being arranged in a second direction perpendicular to the first direction with two or more second plates that extend along the second direction while being arranged in the first direction for integration; inserting the plate frame into an aperture of a molding frame in a vertical direction; pouring a hardening resin pr to hardening to the aperture; placing, a shaping member with a planar bottom face on the aperture of the molding frame, thereby covering a liquid surface of the hardening resin with which the aperture is filled with the bottom face for making the liquid surface flat, and flooding out a part of the hardening resin from the aperture to form a bulge for covering a side edge in the bottom face of the shaping member; hardening the hardening resin with which the aperture is filled to form a light guide with a hardened solid resin embedded in the plate frame, and hardening the bulge to form a burr composed of the solid resin and connecting with the light guide, thereby integrating the light guide with the shaping member, releasing the light guide from the molding frame by lifting the shaping member and the integrated light guide upward in the vertical direction simultaneously; and separating the burr from the light guide to cancel the connection of the light guide and the shaping member.

[Operation and Effect]

In the releasing step in the method of manufacturing the light guide of this invention, the shaping member is lifted up in a vertical direction away from the molding frame. Accordingly, the light guide is lifted up from the aperture of the molding frame, and then pulled out therefrom. Therefore, there is no need to pull out the light guide by conventionally providing the pressing plug in the bottom of the molding frame and pressing the plug in a vertical direction. Consequently, a circular bulge that shows a shape of the contact portion of the pressing plug is not to be formed on a surface of the light guide that contacts the bottom of the molding frame.

Moreover, in the step of placing the shaping member, the bottom face of the shaping member covers the liquid surface of the thermosetting resin with which the aperture is filled. Here, the bottom face is planar, and accordingly the liquid surface is to be flat. That is, no meniscus appears on the liquid surface of the thermosetting resin. In other words, upon completion of removing the burr, the surface of the light guide that contacts the shaping member is already flat with no grinding process performed thereto. As a result, the grinding process for grinding the light guide may be eliminated in the construction of this invention.

A material of the first plate mentioned above is preferably selected from one of a material that reflects light, a material that absorbs light, and a material that transmits light.

Moreover, a material of the second plate mentioned above is preferably selected from one of a material that reflects light, a material that absorbs light, and a material that transmits light.

[Operation and Effect]

With the foregoing construction, more various light guides may be provided according to purposes. The plate provided in the light guide differs in its suitable material depending on a radiation detector. According to the foregoing construction, each material of the first plate and the second plate may appropriately be selected, whereby a situation increases where the light guide of this invention may be adopted.

Two or more grooves are formed along the vertical direction between each of the first plates and each of the second plates. It is more preferable, in the step of forming the plate frame, to fit the grooves in the first plates with the grooves in the second plates for forming the plate frame.

[Operation and Effect]

With the foregoing construction, the plate frame may readily be formed. The plate frame of this invention is manufactured by fitting the grooves of the first plates and the second plates that intersects perpendicularly with each other, which ensures the plate frame having both plates integrated.

Moreover, the foregoing shaping member has a taper portion at the side end thereof having a thickness decreasing from the bottom face in the vertical direction so as to be adjacent to the side edge of the bottom face.

[Operation and Effect]

With the foregoing configuration, the taper portion in the shaping member has a thickness decreasing from the bottom face in a vertical direction, whereby it is ensured that the taper portion engages the burr. Accordingly, lifting up of the shaping member in a direction away from the frame in the vertical direction ensures lifting of the light guide from the aperture of the frame and pulling out therefrom.

In addition, the method of manufacturing the radiation detector having the light guide according to this invention further includes the steps of manufacturing a scintillator by arranging scintillation counter crystals that convert radiation into fluorescence in three dimensions; laminating the scintillator and the light guide in a given direction and coupled to each other; and coupling the light guide and a fluorescence detector that detects fluorescence in the given direction.

[Operation and Effect]

According to the foregoing construction, a radiation detector may be manufactured with no grinding process performed to the light guide. Upon completion of removing the burr, both surfaces of the light guide that transmits fluorescence are flat. Consequently, the light guide may be incorporated into the radiation detector by merely grinding the both surfaces thereof. In other words, the foregoing construction may shorten a complicated grinding process, which results in improved manufacturing efficiency of the radiation detector and provision of the radiation detector of low price.

Effect of the Invention

According to the method of manufacturing the light guide of this invention, a light guide may readily be manufactured with no grinding process performed thereto. With this invention, the light guide is not required for grinding. Consequently, the corner of the light guide may not be fractured through grinding of the light guide. Therefore, manufacturing yield of the light guide is enhanced, and a complicated grinding process is shortened to improve manufacture efficiency of the light guide and provide a light guide of low price.

DESCRIPTION OF REFERENCES

Figure 1:
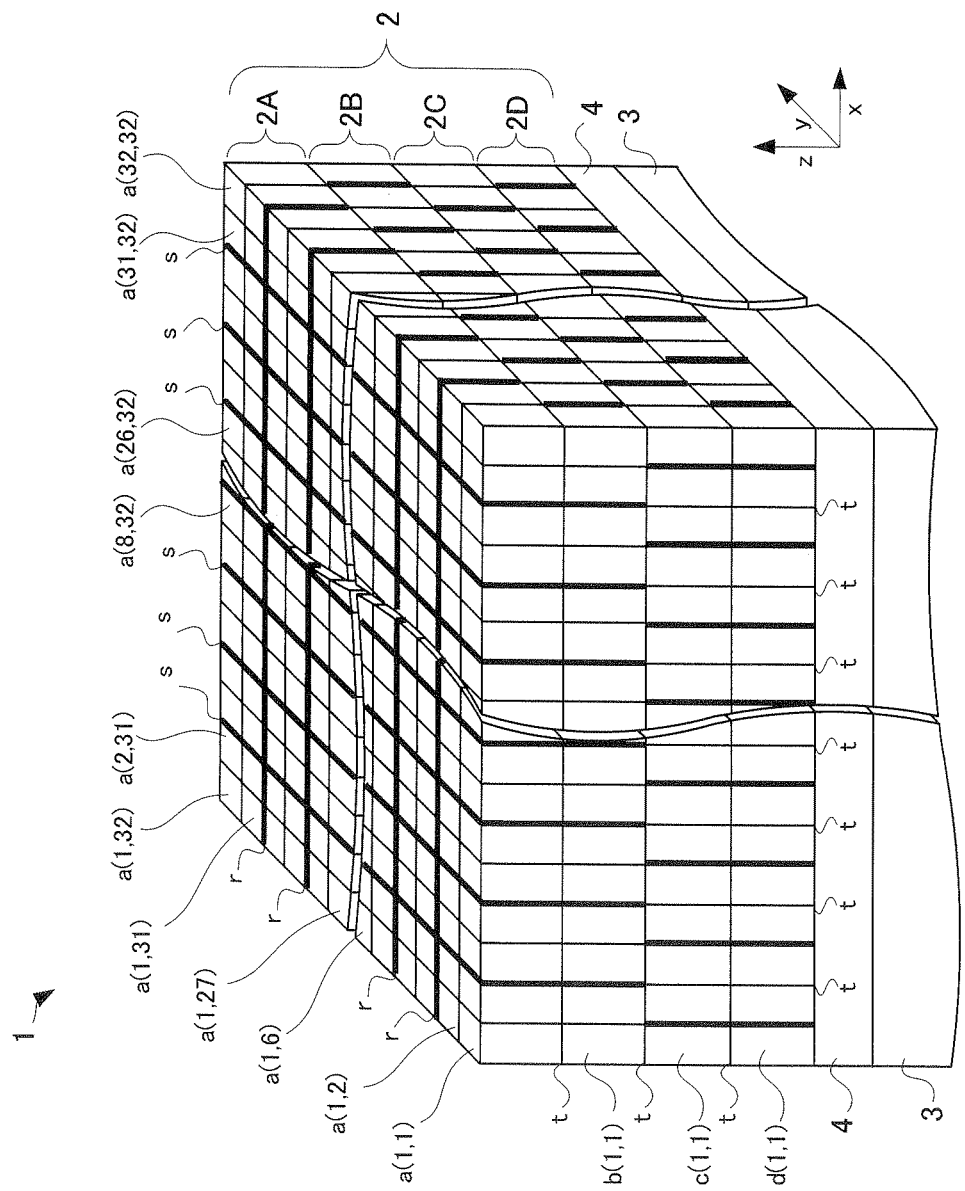
FIG. 1 is a perspective view of a radiation detector according to Embodiment 1.

1 . . . radiation detector
4 . . . light guide
4a . . . first plate
4b . . . second plate
5a . . . groove
5b . . . groove
6 . . . plate frame
7 . . . molding frame
7a . . . aperture
8 . . . thermosetting resin
9 . . . shaping member
9a . . . bottom face
9b . . . tapered portion
10 . . . bulge
12 . . . burr

BEST MODE FOR CARRYING OUT THE INVENTION

Embodiments of a method of manufacturing a radiation detector according to this invention will be described hereinafter with reference to the drawings.

Embodiment 1

Firstly, description will be given to a construction of a radiation detector according to Embodiment 1. FIG. 1 is a perspective view of the radiation detector according to Embodiment 1. As shown in FIG. 1, the radiation detector 1 according to Embodiment 1 includes a scintillator 2 that is formed of scintillation counter crystal layers each laminated in order of a scintillation counter crystal layer 2D, a scintillation counter crystal layer 2C, a scintillation counter crystal layer 2B, and a scintillation counter crystal layer 2A, in turn, in a z-direction, a photomultiplier tube (hereinafter referred to as PMT) 3 having a function of position discrimination that is provided on an undersurface of the scintillator 2 for detecting fluorescence emitted from the scintillator, and a light guide 4 interposed between the scintillator 2 and the PMT 3. Consequently, each of the scintillation counter crystal layers is laminated in a direction toward the PMT 3. Here, the scintillation counter crystal layer 2A corresponds to an incident surface of radiation in the scintillator 2. Each of the scintillation counter crystal layers 2A, 2B, 2C, and 2D is optically coupled, and includes a transparent material t between each of the layers. The transparent material t passes through fluorescence generated in the scintillation counter crystal layers to guide the fluorescence into the PMT 3. The transparent material t also adheres the scintillation counter crystals adjacent to one another in the z-direction. A thermosetting resin composed of a silicone resin may be used for the transparent material t. The scintillation counter crystal layer 2A corresponds to a receiver of the gamma rays emitted from a radioactive source. The scintillation counter crystals in a block shape are arranged in a two-dimensional array with thirty-two numbers of the scintillation counter crystals in an x-direction and thirty-two numbers of the scintillation counter crystals in a y-direction relative to a scintillation counter crystal a (1, 1). That is, the scintillation counter crystals from a (1, 1) to a (1, 32) are arranged in the y-direction to form a scintillator crystal array. Thirty-two numbers of the scintillator crystal arrays are arranged in the x-direction to form a scintillation counter crystal layer 2A. Here, as for the scintillation counter crystal layers 2B, 2C, and 2D, thirty-two numbers of the scintillator counter crystals are also arranged in the x-direction and the y-direction in a matrix in a two-dimensional array relative to a scintillation counter crystal b (1, 1), c (1, 1), and d (1, 1), respectively. In each of the scintillation counter crystal layers 2A, 2B, 2C, and 2D, the transparent material t is also provided between the scintillation counter crystals adjacent to each other. Consequently, each of the scintillation counter crystals is to be enclosed with the transparent material t. The transparent material t has a thickness around 25 μm. Here, the PMT corresponds to the fluorescence detector in this invention. The x-direction and the y-direction correspond to the first direction and the second direction, respectively, in this invention. A gamma ray corresponds to radiation in this invention.

The scintillator 2 has scintillation counter crystals suitable for detection of gamma rays in a three-dimensional array. That is, the scintillation counter crystal is composed of Ce-doped $Lu_{2(1-N)}Y_2xSiO_5$ (hereinafter referred to as LYSO.) Each of the scintillation counter crystals is, for example, a rectangular solid having a width of 1.45 mm in the x-direction, a width of 1.45 mm in the y-direction, and a height of 4.5 mm regardless of the scintillation counter crystal layer. The scintillator 2 has four side end faces that are covered with a reflective film not shown. The PMT 3 is multi-anode type, and allows position discrimination of incident fluorescence in the x and y.

Figure 2:
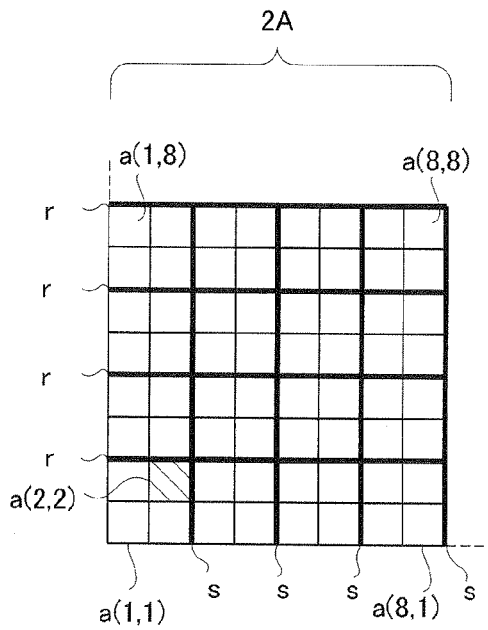
FIG. 2 is a plan view showing a construction of scintillation counter crystal layers of the radiation detector according to Embodiment 1.
Figure 2:
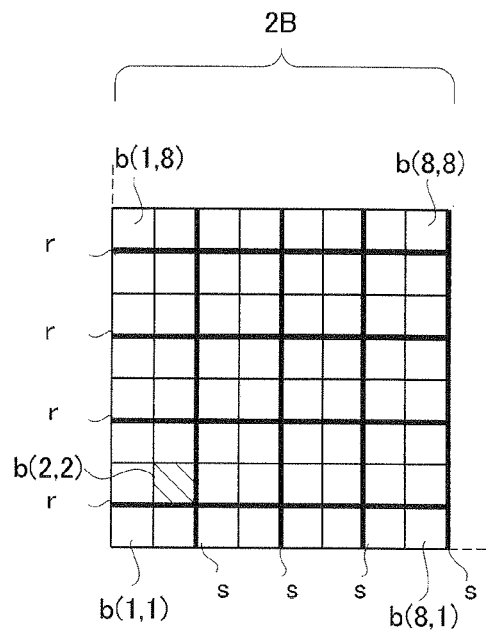
Figure 2:
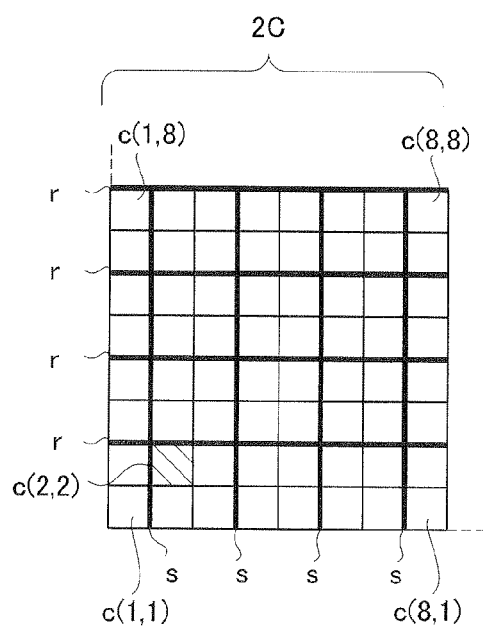
Figure 2:
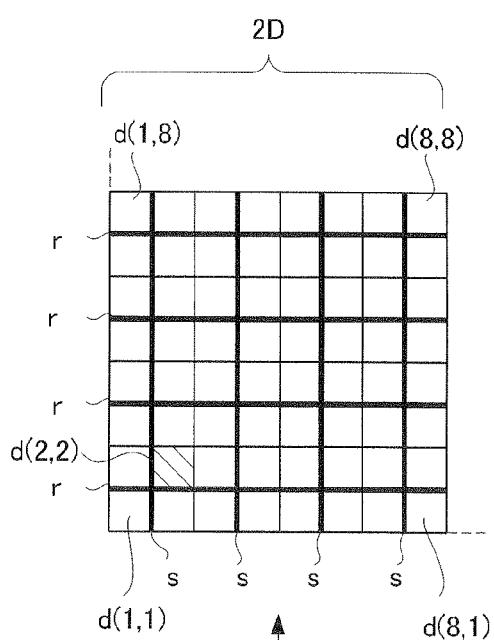

In the scintillation counter crystal layers 2A, 2B, 2C, and 2D of the scintillator 2, first elongated reflectors r that extend in the x-direction are provided so as to be inserted between the scintillation counter crystals, and second elongated reflectors s that extend in the y-direction are provided as to be inserted between the scintillation counter crystals. The first reflectors r adjacent to each other are spaced apart by two scintillation counter crystals. The second reflectors r adjacent to each other are spaced apart by two scintillation counter crystals. FIG. 2 is a plan view showing a construction of scintillation counter crystal layers in the radiation detector according to Embodiment 1. As shown in FIG. 2, each of the scintillation counter crystal layers 2A, 2B, 2C, and 2D differs from one another in inserting pattern of both reflectors. Specifically, the scintillation counter crystal layers 2B has an inserting pattern of both reflectors that is shifted by one scintillation counter crystal in the y-direction from that of scintillation counter crystal layers 2A. The scintillation counter crystal layers 2C has an inserting pattern of both reflectors that is shifted by one scintillation counter crystal in the x-direction from that of scintillation counter crystal layers 2A. The scintillation counter crystal layers 2D has an inserting pattern of both reflectors that is shifted by one scintillation counter crystal in the xy-directions from that of scintillation counter crystal layers 2A.

Figure 3:
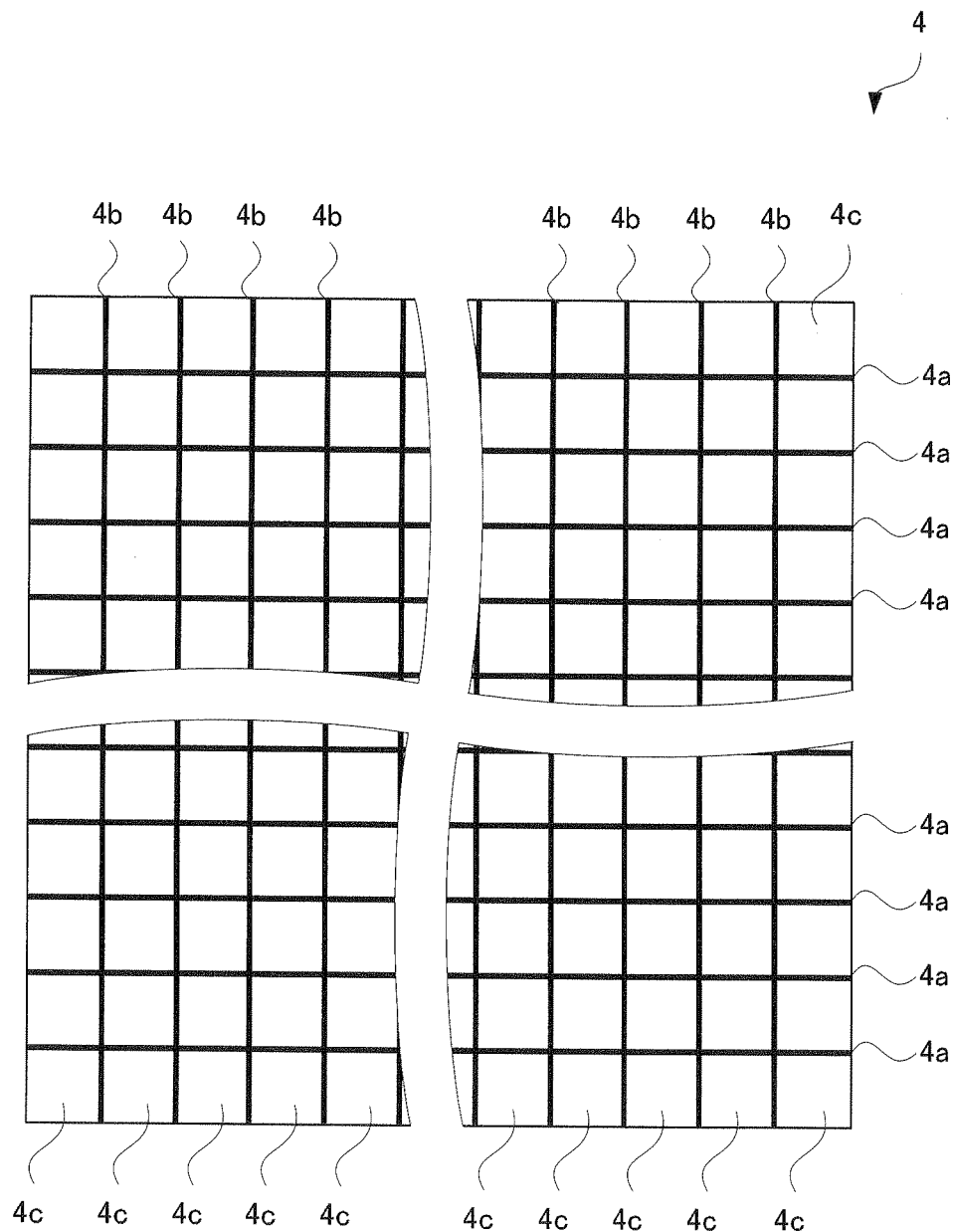
FIG. 3 is a plan view showing a construction of a light guide according to Embodiment 1.
Figure 3:
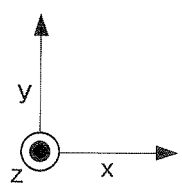
Figure 4:
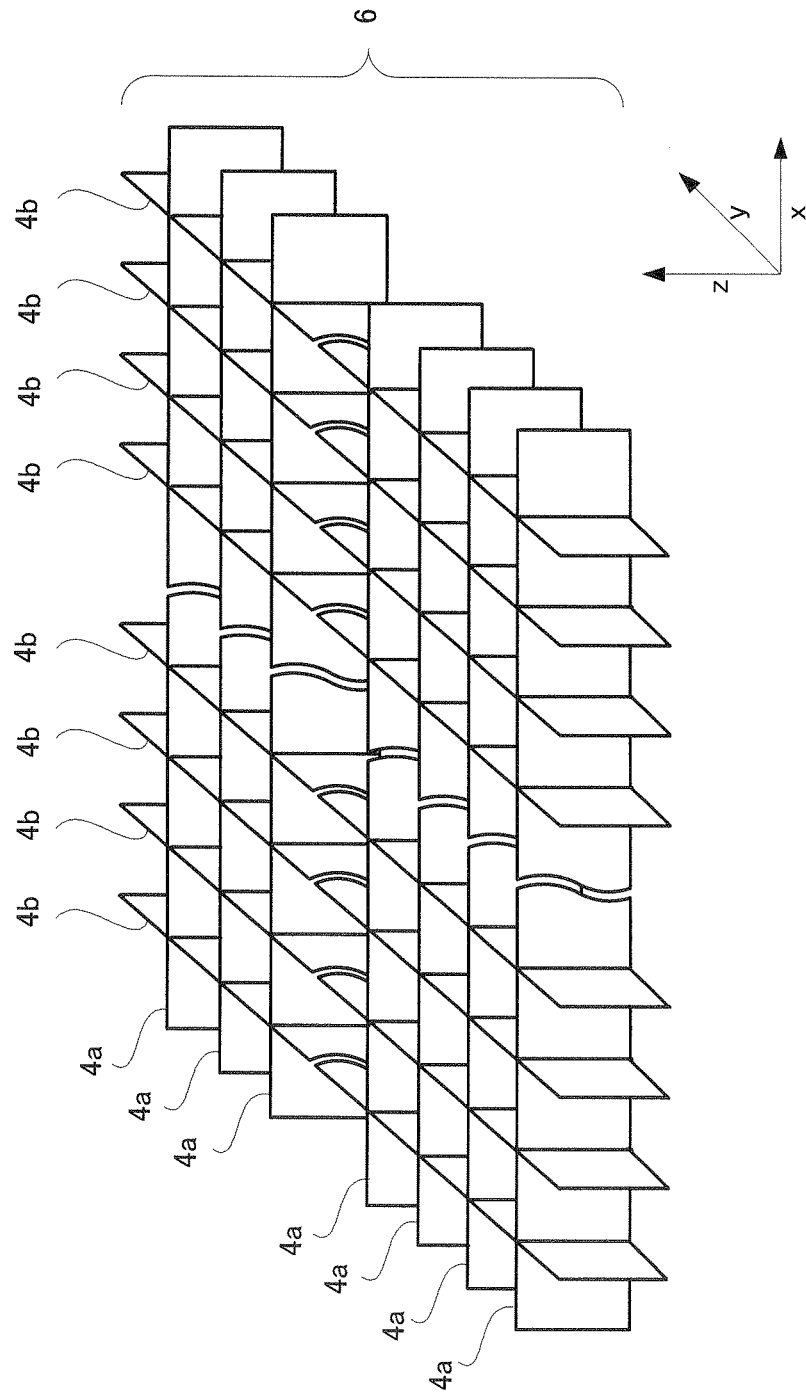
FIG. 4 is a perspective view showing a construction of a plate frame according to Embodiment 1.

The light guide 4 is provided for guiding fluorescence emitted in the scintillation 2 into the PMT 3. Consequently, the light guide 4 is optically coupled to the scintillator 2 and the PMT 3. The construction of the light guide 4 will be described. FIG. 3 is a plan view showing a construction of the light guide according to Embodiment 1. As shown in FIG. 3, the light guide 4 has thirty-one elongated first plates 4a extending in the x-direction that are arranged in the x-direction so as to penetrate the light guide 4 in the z-direction. Moreover, the light guide 4 has thirty-one elongated second plates 4b extending in the y-direction that are arranged in the y-direction so as to penetrate the light guide 4 in the z-direction. The first plates 4a and the second plates 4b form the plate frame 6 as shown in FIG. 4, when seen as a whole the light guide 4. A resin block 4c that transmits light is inserted into each section that the plate frame 6 divides (see FIG. 3.) The resin block 4c is also provided on the side end of the light guide 4. Consequently, each of the first plates 4a and the second plates 4b is interposed between the resin blocks 4c. Here, the resin block 4c has a same arrangement pitch as the scintillation counter crystal layers 2A, 2B, 2C, and 2D. As a result, each of resin blocks 4c and scintillation counter crystals d that form the scintillation counter crystal layer 2D is combined by one to one. The configuration of the plate frame 6 will be described in detail hereinafter.

The first plate 4a and the second plate 4b are composed of a reflector that reflects fluorescence emitted in the scintillator 2. Consequently, the plate frame 6 (see FIG. 4) does not permit fluorescence entering into the light guide 4 from the scintillator 2 to spread in the xy-directions. Fluorescence enters into the PMT 3. Accordingly, the light guide 4 allows to pass on fluorescence from the scintillator 2 to the PMT 3 while maintaining a position where fluorescence is generated in the xy-directions.

Description will be given to a process of discriminating a fluorescence generating position in the x-direction in the radiation detector 1 according to Embodiment 1. As shown in FIG. 2, each of the scintillation counter crystal layers 2A, 2B, 2C, and 2D that forms the scintillator 2 differs from one another in inserting positions of the first reflectors r and the second reflectors s. FIG. 2 shows a portion of the scintillator 2 according to Embodiment 1, and (a), (b), (c) and (d) in the drawing illustrate configurations of the scintillation counter crystal layers 2A, 2B, 2C, and 2D, respectively. Directing attention to the scintillation counter crystals a (2, 2), b (2, 2), c (2, 2), and d (2, 2) on (2, 2), all of the four have two sides adjacent to each other that are covered with the reflectors. The scintillation counter crystals on (2, 2) differ from one another in direction where the reflectors are provided. Thus, four scintillation counter crystals that are identical to one another in the xy-positions have different optical conditions. The fluorescence generated in the scintillation counter crystal reaches the PMT 3 while spreading in the xy-directions. Providing the reflectors leads to addition of directivity to the spreading. Moreover, comparing fluorescence generated in the four scintillation counter crystals having the same xy positions, they differ from one another in direction of spreading. That is, differences in position of generating fluorescence in the z-direction in the scintillator 2 are to be converted into differences of fluorescence in the xy-directions. The PMT 3 may detect a slight deviation of the fluorescence in the xy-directions due to the differences in the position in the z-direction, and may calculate the position of generating fluorescence in the z-direction from it.

Description will be given to a method of manufacturing such a radiation detector noted above. Particularly, description will be given to a method of manufacturing a light guide in Embodiment 1.

<Plate Frame Manufacturing Step>

Figure 5:
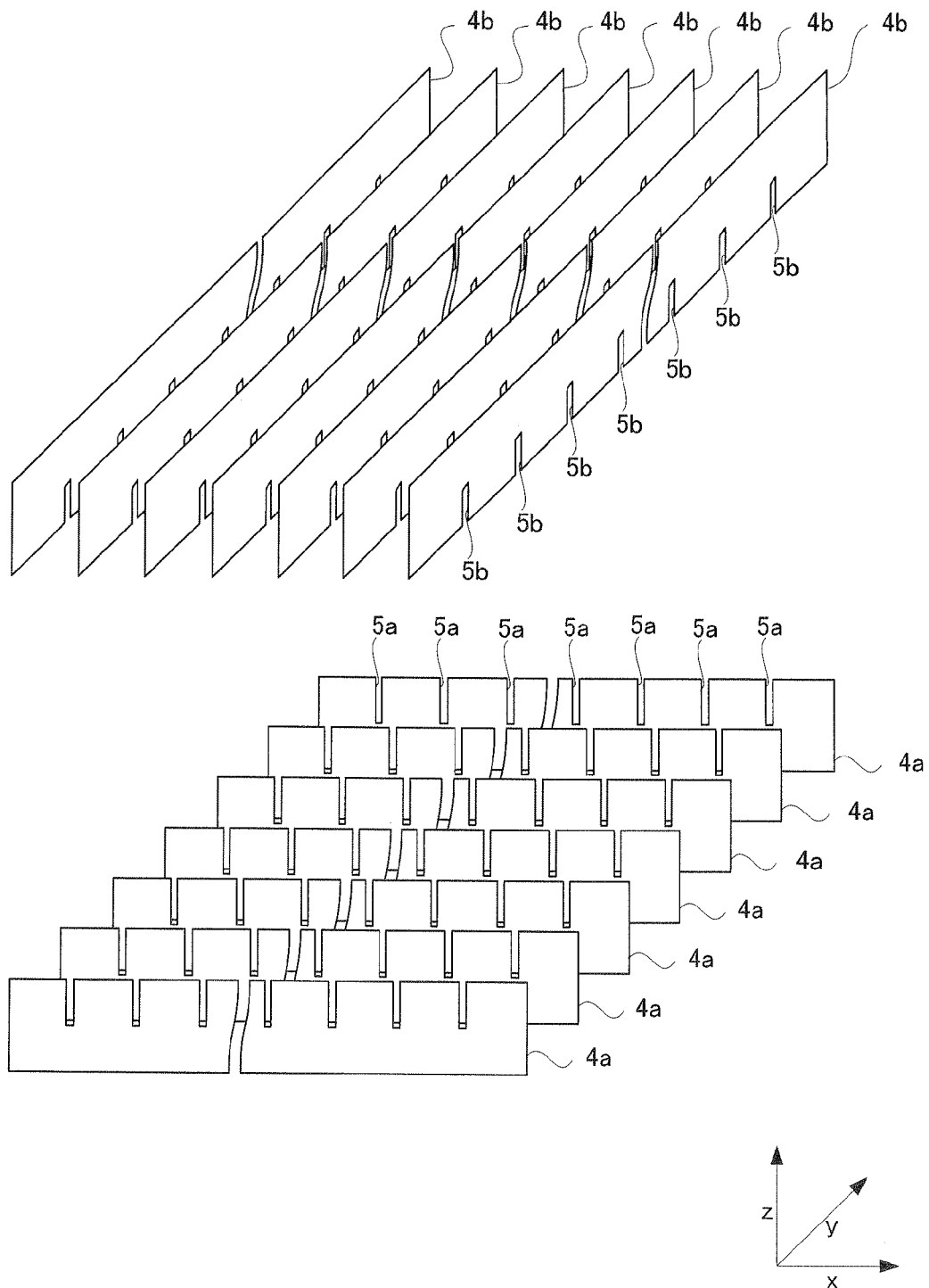
FIG. 5 is a perspective view showing a step of manufacturing the plate frame according to Embodiment 1.

FIG. 5 is a perspective view showing a process of manufacturing the plate frame according to Embodiment 1. The first plates 4a are arranged in the y-direction for manufacturing a plate frame according to Embodiment 1. As shown in FIG. 5, the first plate 4a is a strip member having a long side direction along the x-direction, a short side direction along the z-direction, and a thickness direction along the y-direction. The first plate 4a has two or more grooves 5a along the z-direction. Directing attention to a single first plate 4a, the grooves 5a are arranged approximately at equal intervals, and have openings provided in a uniform direction with respect to the z-direction. Moreover, as shown in FIG. 5, the second plate 4b is a strip member having a long side direction along the y-direction, a short side direction along the z-direction, and a thickness direction along the x-direction. The second plate 4b has two or more grooves 5b along the z-direction. Directing attention to a single second plate 4b, the grooves 5b are arranged approximately at equal intervals, and have openings provided in a uniform direction with respect to the z-direction. In the plate frame manufacturing step, the second plates 4b approach the first plates 4a along the z-direction, thereby fitting the grooves 5a and 5b of both plates 4a and 4b to one another. Thus, the second plates 4b are arranged in the x-direction. The first plates 4a and the second plates 4b are integrated with each other to manufacture a plate frame 6 having both plates 4a, 4b arranged in a lattice shape as shown in FIG. 4.

<Plate Frame Insertion Step>

Figure 6:
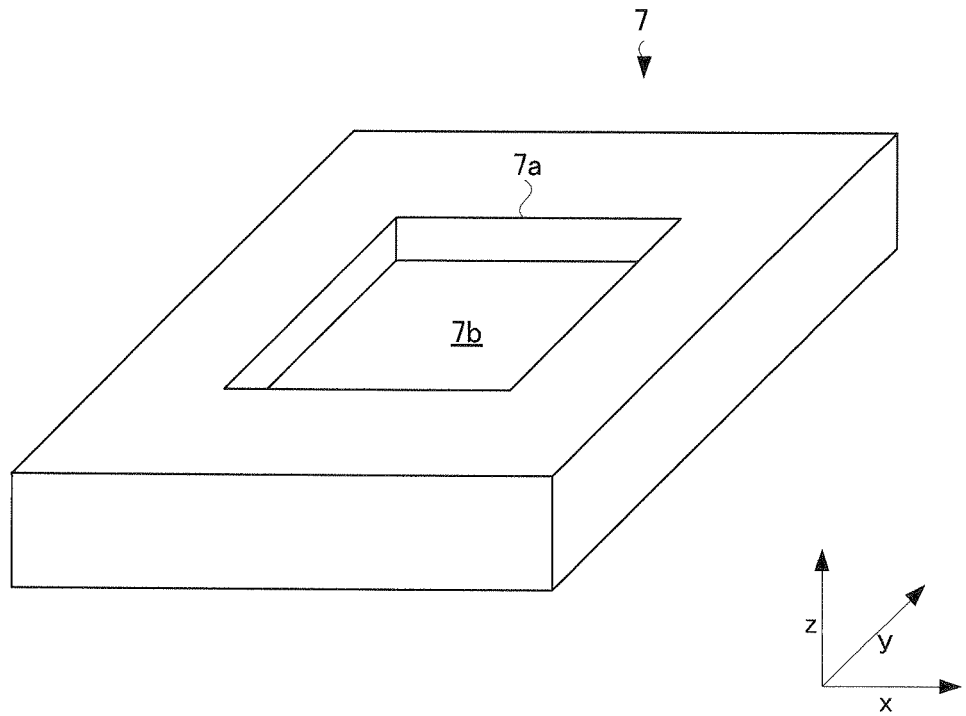
FIG. 6 is a perspective view showing a construction of a molding frame according to Embodiment 1.

Next, the plate frame 6 is inserted into the molding frame 7. Prior to explanation on the plate frame insertion step, description will be given to the configuration of the molding frame 7. FIG. 6 is a perspective view showing a configuration of the molding frame according to Embodiment 1. The molding frame 7 of Embodiment 1 has an aperture 7a upward in the z-direction. The aperture 7a is rectangular seen in the z-direction, and has a depth in the z-direction approximately identical to a thickness in the z-direction of the light guide according to Embodiment 1. The bottom of the aperture 7a in the z-direction constitutes a close end surface 7b in s planar shape. The close end face 7b is not always required for providing a pressing plug, etc. The molding frame 7 may be composed of, for example, fluorocarbon polymers.

Figure 7:
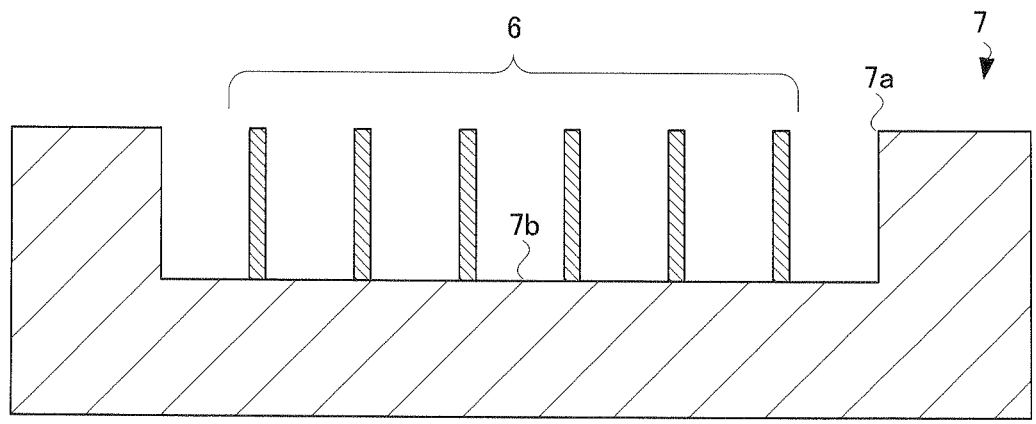
FIG. 7 is a sectional view showing a step of inserting the plate frame according to Embodiment 1.

FIG. 7 is a sectional view showing a step of inserting the plate frame according to Embodiment 1. As shown in FIG. 7, in the plate frame insertion step, the plate frame 6 is inserted into the aperture 7a in the z-direction. Here, the aperture 7a has a length in the x-direction approximately same as that in the long side direction of the first plate 4a, and a length in the y-direction approximately same as that in the long side direction of the second plate 4b. As a result, four side ends of the plate frame 6 abut the four side end faces of the aperture 7a. As shown in FIG. 7, the plate frame 6 is inserted into the aperture 7a of the molding frame 7. A release agent is applied in advance to the aperture 7a of the molding frame 7 for releasing the cured thermosetting resin. In FIG. 7, the number of the plates that form the plate frame 6 is omitted. Likewise, the number of the plates is to be omitted in the subsequent drawings. FIGS. 7 to 11 are sectional views in the zx-plane. Embodiment 1 has a similar yz-plane in its sectional view. The z-direction here corresponds to the vertical direction in this invention.

<Pouring Step>

Figure 8:
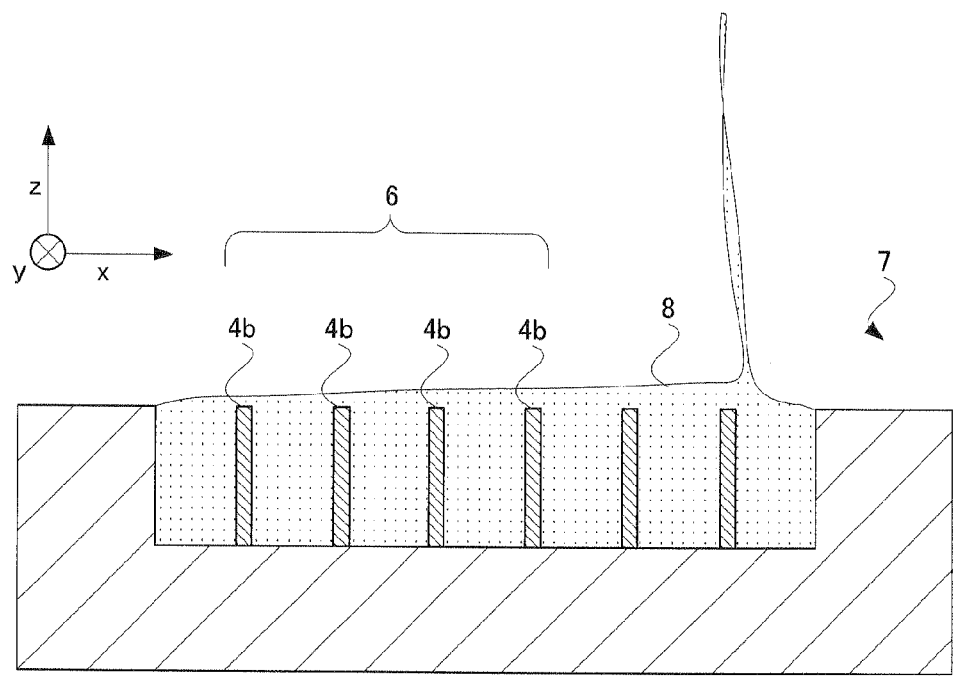
FIG. 8 is a sectional view showing a pouring step according to Embodiment 1.
Figure 9:
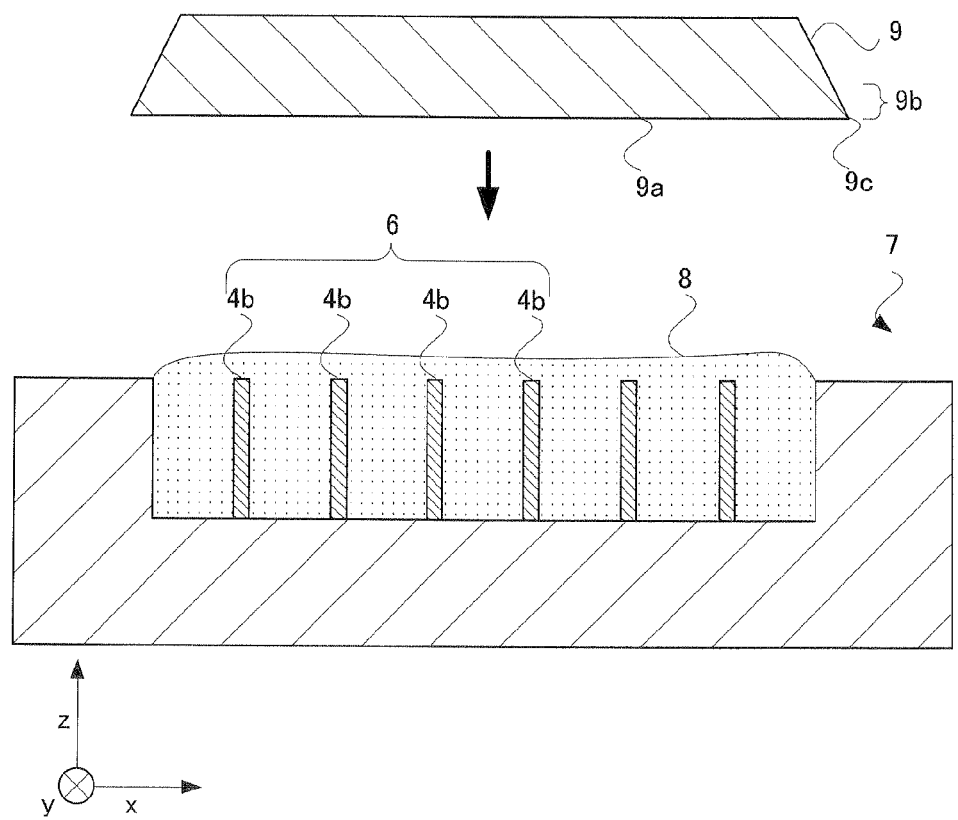
FIG. 9 is a sectional view showing the pouring step according to Embodiment 1.

Subsequently, the liquid thermosetting resin is poured into the aperture 7a. FIGS. 8 and 9 are sectional views each showing the pouring step according to Embodiment 1. As shown in FIG. 8, the liquid thermosetting resin 8 is poured into the aperture 7a of the molding frame 7 in the z-direction. The thermosetting resin 8 prior to curing is liquid. Thus, the aperture 7a may readily be filled with the thermosetting resin 8. Moreover, degassing process is performed in advance to the thermosetting resin 8. When cured, the thermosetting resin 8 is changed into a transparent solid resin so as to transmit fluorescence. In the pouring step, the plate frame 6 inserted into the aperture 7a goes-down into the thermosetting resin 8. Accordingly, an upper end of the plate frame 6 in the z-direction is covered with the thermosetting resin 8. The thermosetting resin 8 is raised from the aperture 7a due to a surface tension when seen as a whole the molding frame 7. Here, the thermosetting resin corresponds to the hardening resin in this invention. Specifically, an epoxy resin may be used, for example.

<Shaping Member Placing Step>

Subsequently, the shaping member 9 is placed so as to cover the aperture 7a of the molding frame 7. First, description will be given to the configuration of the shaping member 9. As shown in FIG. 9, the shaping member 9 has a bottom face 9a in a planar shape. The bottom face 9a has a length in the x-direction longer than that of the first plate 4a in the long side direction. Likewise, the bottom face 9a has a length in the y-direction longer than that of the first plate 4a in the long side direction. Accordingly, the bottom face 9a of the shaping member 9 is larger than the aperture 7a of the molding frame 7. The molding frame 7 may be formed of a fluorocarbon resin, for example. The taper portion 9b is provided adjacent to the side edge 9c in the bottom face 9a of the side ends in the shaping member 9 that has a thickness decreasing from the bottom face 9a in the vertical direction.

In the shaping member placing step, the bottom face 9a of the shaping member 9 is placed on the molding frame 7, thereby covering the liquid surface of the thermosetting resin 8 with which the aperture 7a of the molding frame 7 is filled. In the covering process, it is preferable to place the shaping member 9 on the molding frame 7 over a sufficient period of time such that no bubble is contained between the liquid surface of the thermosetting resin 8 and the bottom face 9a. Moreover, in this step, the liquid surface of the thermosetting resin 8 is covered with the bottom face 9a. Here, the bottom face 9a is planar, and accordingly the liquid surface is to be flat. In addition, the bottom face 9a is rectangular, and larger than the aperture 7a of the molding frame 7 in size in the xy-directions. Consequently, upon completion of the shaping member placing step, the aperture 7a is entirely covered with the shaping member 9, when seen the molding frame 7 in the z-direction. In other words, the aperture 7a is entirely covered with the bottom face 9a. A release agent is applied in advance to the bottom face 9a of the shaping member 9 for releasing the cured thermosetting resin.

Figure 10:
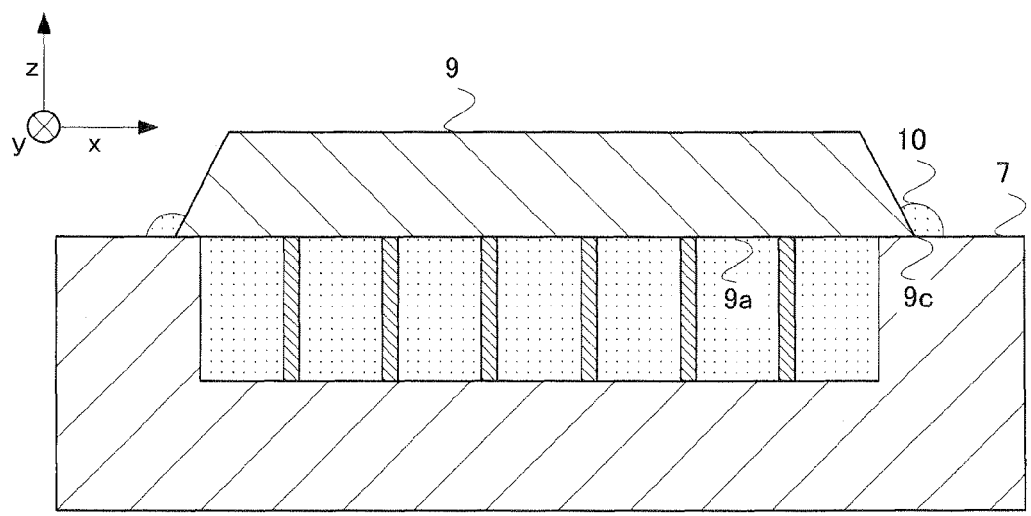
FIG. 10 is a sectional view showing a step of placing a shaping member according to Embodiment 1.
Figure 10:
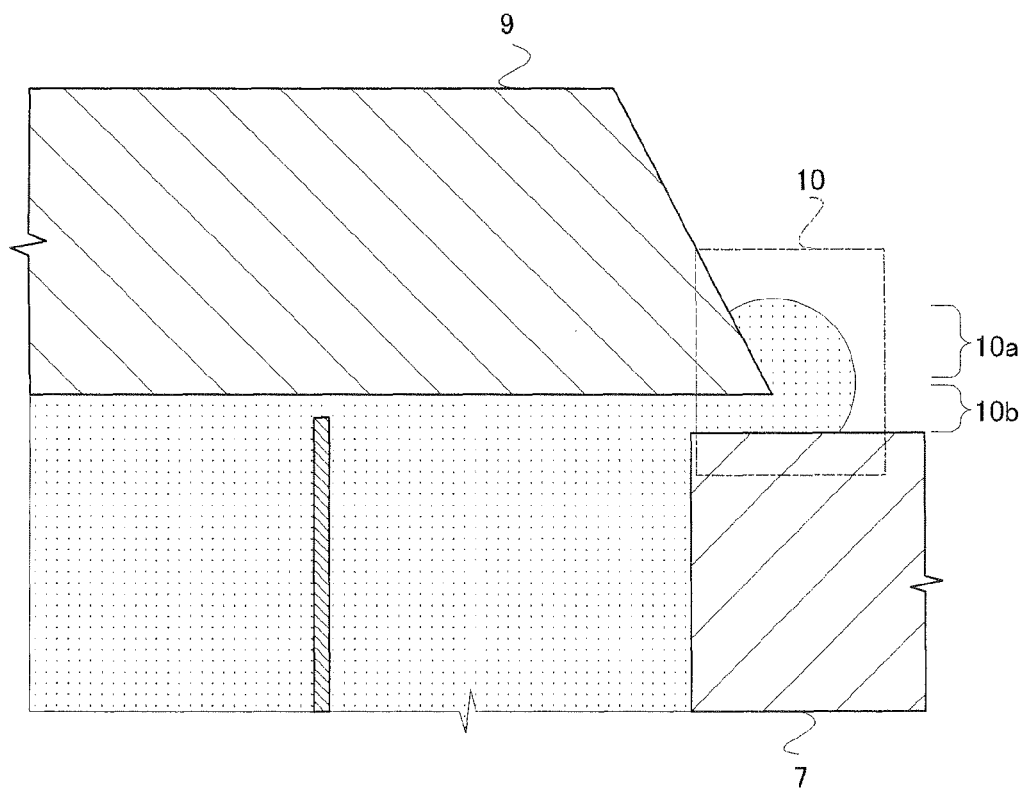

In the shaping member placing step, the shaping member 9 is pressed against the molding frame 7. Accordingly, the bottom face 9a of the shaping member 9 is parallel to the close end face 7b. FIG. 10 is a sectional view showing the shaping member placing step according to Embodiment 1. Particularly, the configuration is shown upon completion of the pressing mentioned above. As shown in FIG. 10(a), the shaping member 9 is pressed for supporting the molding frame 7. The thermosetting resin 8 is raised from the aperture 7a in the previous step. When pressed with the shaping member 9, the thermosetting resin 8 overflows outward from the aperture 7a by a volume over the aperture 7a. Consequently, as shown in FIG. 10(a), a bulge 10 composed of the overflowed thermosetting resin 8 is formed on the side edge 9c of the bottom face 9a. The bulge 10 is formed along the side edge of the shaping member 9, and has a square shape when seen as a whole the molding frame 7. When pressing of the shaping member 9 is cancelled, the thermosetting resin 8 is to flow between the shaping member 9 and the molding frame 7.

FIG. 10(b) is an enlarged sectional view of the side edge. As shown in FIG. 10(b), the bulge 10 has a raised portion 10a that is raised from the aperture 7a and a channel portion 10b that connects the raised portion 10a and the thermosetting resin 8 with which the aperture 7a is filled. Here in FIG. 10(b), the channel portion 10b is shown highlighted as if the shaping member 9 is apart from the molding frame 7. Actually, the channel portion 10b is filmy.

<Resin Curing Step>

Next, the molding frame 7 is put into an oven maintained at a predetermined temperature with the shaping member 9 placed thereon for curing the thermosetting resin. The light guide 4 with the plate frame 6 embedded into a solid resin 11 is to be formed inside the aperture 7a of the molding frame 7. Simultaneously, the bulge 10 is cured on the side edge 9c of the bottom face 9a in the shaping member 9 to form the burr 12 of the solid resin. The burr 12 has a raised portion 12a that is raised from the aperture 7a and a channel portion 12b that connects the raised portion 12a and the light guide 4 extending in the aperture 7a. The state is like that in FIG. 10(b). Here, the numeral number 10 in the drawing is to be interpreted as the numeral number 12. The shaping member 9 here is supported on the shaping member 9 via a film channel 12b.

<Releasing Step>

Figure 11:
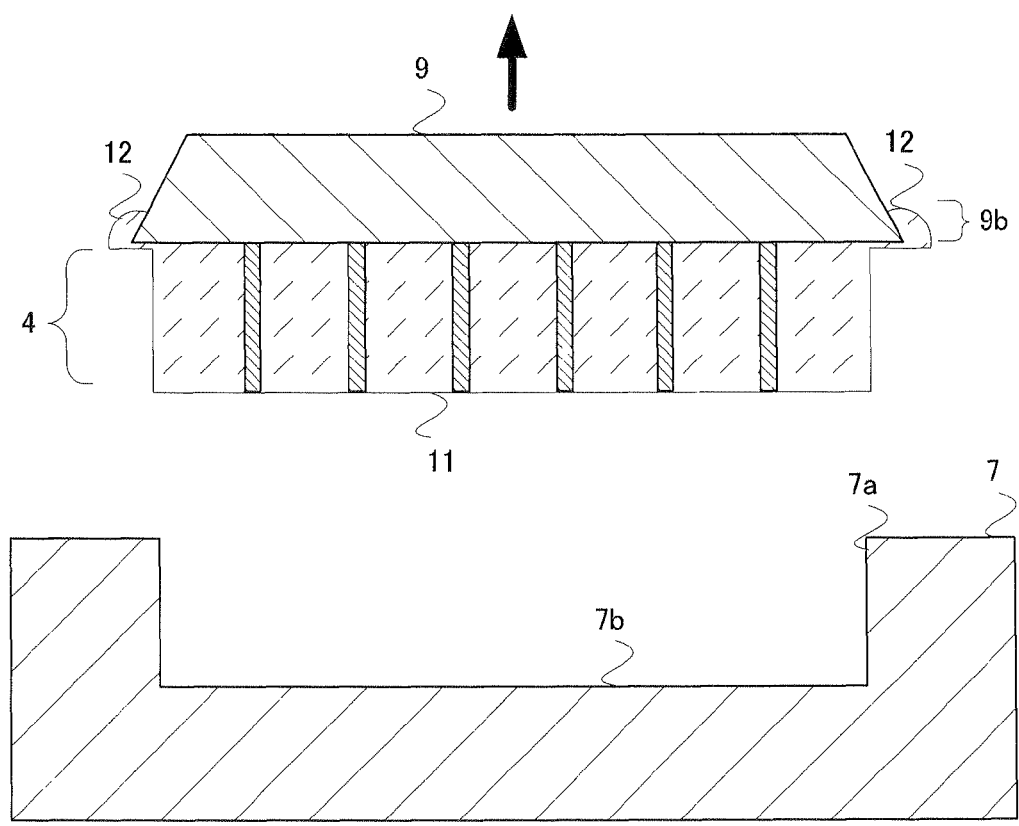
FIG. 11 is a sectional view showing the step of releasing the molding frame according to Embodiment 1.
Figure 11:
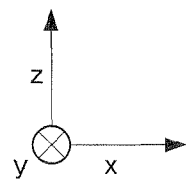

Subsequently, the shaping member 9 is lifted up in the z-direction apart from the molding frame 7 (see FIG. 11.) A taper portion 9b provided in the shaping member 9 has a thickness decreasing from the bottom face 9a in the z-direction, and thus the taper portion 9b is engaged with the raised portion 12a. When the shaping member 9 is lifted up in the z-direction apart from the molding frame 7, the raised portion 12a is also simultaneously lifted up together with the shaping member 9. The raised portion 12a is connected to the light guide 4 via the channel 12b. Consequently, as shown in FIG. 11, when the shaping member 9 is lifted up in the z-direction apart from the molding frame 7, the light guide 4 is pulled out from the aperture 7a of the molding frame 7 accordingly to release the light guide 4 from the molding frame 7.

<Burr Separation Step>

Thereafter, the burr 12 connected to the light guide 4 is separated therefrom. Specifically, the channel 12b is separated from the light guide 4. Here, the channel 12b is filmy, and thus no tool is particularly required for the separation.

<Grinding Step>

Finally, a grinding process is performed to both of a surface of the light guide contacting the shaping member 9 and that contacting the close end face 7b of the molding frame 7 in the light guide 4, thereby completing the light guide according to Embodiment 1.

Figure 15:
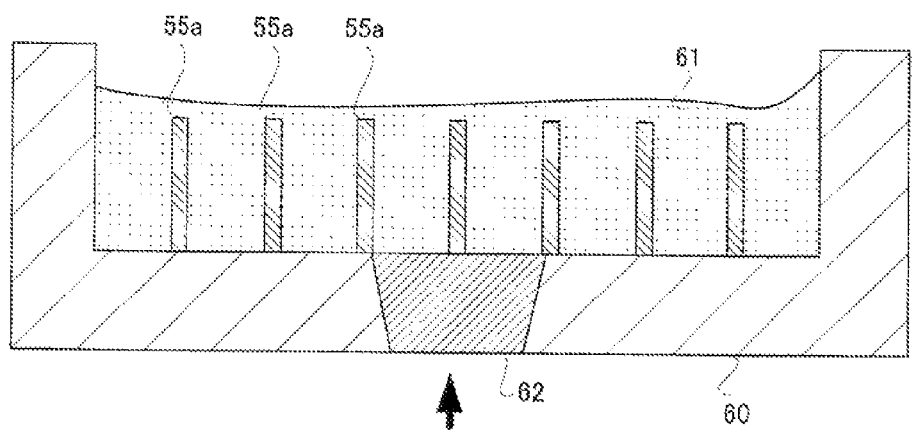
FIG. 15 is a sectional view showing a method of manufacturing a conventional light guide.
Figure 15:
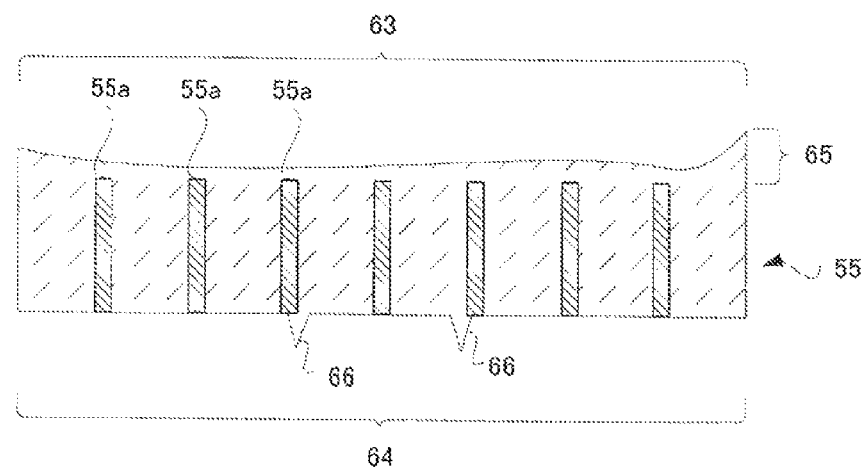
Figure 15:
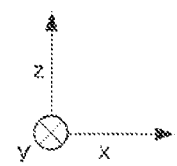

With the method of manufacturing the light guide according to Embodiment 1, the thermosetting resin 8 is poured enough during the pouring step to be raised from the aperture 7a due to a surface tension, which ensures formation of the bulge 10 in the latter shaping member placing step. Moreover, in the latter releasing step, when the shaping member 9 is lifted up in the z-direction apart from the molding frame 7, the light guide 4 is certainly lifted and pulled out from the aperture 7a of the molding frame 7 accordingly. As a result, there is no need to pull out the light guide 4 by conventionally providing the pressing plug 62 as shown in FIG. 15 on the bottom of the molding frame 7 and pressing the plug 62 in the z-direction. Therefore, no circular bulge 66 is to be formed on the light guide 4 that shows a shape of the contact portion in the pressing plug 62.

The close end face of the aperture 7a in the molding frame 7 is planar. Accordingly, the thermosetting resin 8 poured into the aperture 7a is to be planar. That is, the surface of the light guide 4 that contacts the close end face 7b is already flat without performing a grinding process at the time when the light guide 4 is pulled out from the molding frame 7. Consequently, the grinding step of grinding the light guide 4 may be eliminated in the construction of Embodiment 1.

Moreover, in the shaping member placing step, the bottom face 9a covers the liquid surface 9a of the thermosetting resin 8 with which the aperture 7a is filled. Here, the bottom face 9a of the shaping member 9 is planar, and accordingly the liquid surface is to be flat. That is, no meniscus 65 appears on the liquid surface of the thermosetting resin 8. In the resin curing step, the thermosetting resin 8 is to be cured while maintaining the shape of the liquid surface thereof. Thus, the surface of the light guide 4 that contacts the shaping member 9 is already flat without performing a grinding process at the time when separation of the burr is completed. Consequently, the grinding step of grinding the light guide 4 may be eliminated in the construction of Embodiment 1.

The taper portion 9b provided in the shaping member 9 has a thickness decreasing from the bottom face 9a in the z-direction. Thus, the taper portion c is certainly engaged with the raised portion 12a. As a result, when the shaping member 9 is lifted up in the z-direction apart from the molding frame 7, the light guide 4 is certainly lifted and pulled out from the aperture 7a of the molding frame 7 accordingly.

As mentioned above, with the method of manufacturing the light guide according to Embodiment 1, the light guide may readily be manufactured with no grinding process performed thereto. According to Embodiment 1, the light guide 4 is not required for grinding. Consequently, the corner of the light guide 4 may not be fractured through grinding of the light guide 4. Therefore, manufacturing yield of the light guide 4 is enhanced, and a complicated grinding process is shortened to improve manufacture efficiency of the light guide 4, which results in manufacturing of the light guide 4 of low price.

Embodiment 2

Figure 12:
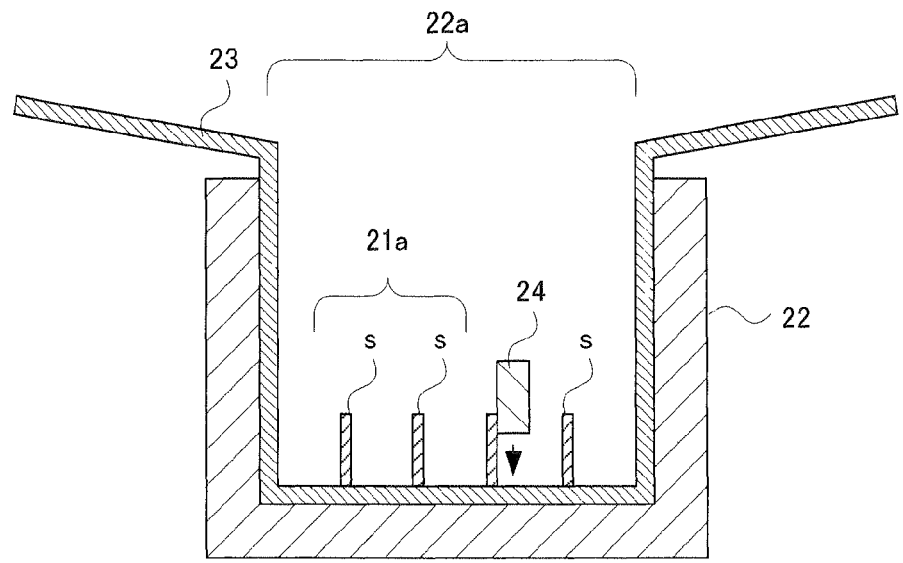
FIG. 12 is a sectional view showing a method of manufacturing a radiation detector according to Embodiment 2.
Figure 12:
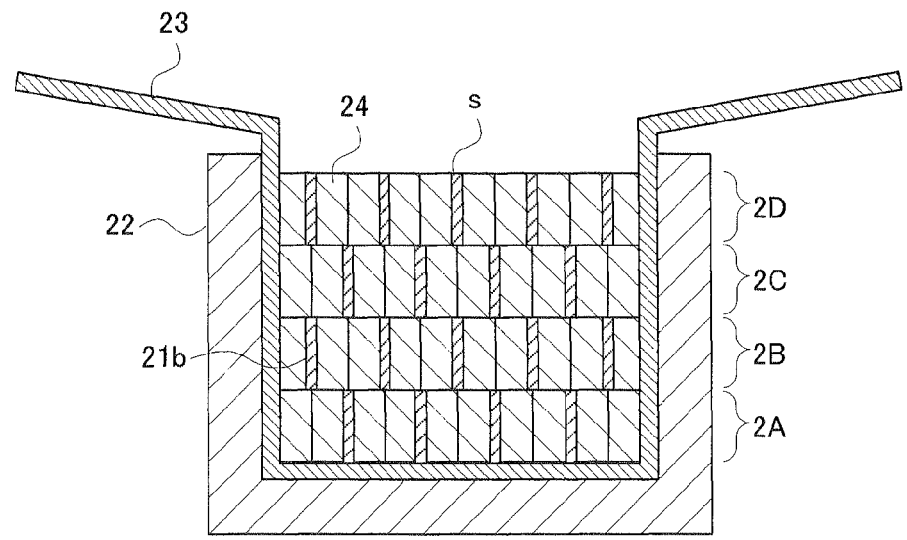
Figure 12:
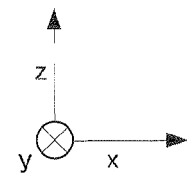
Figure 13:
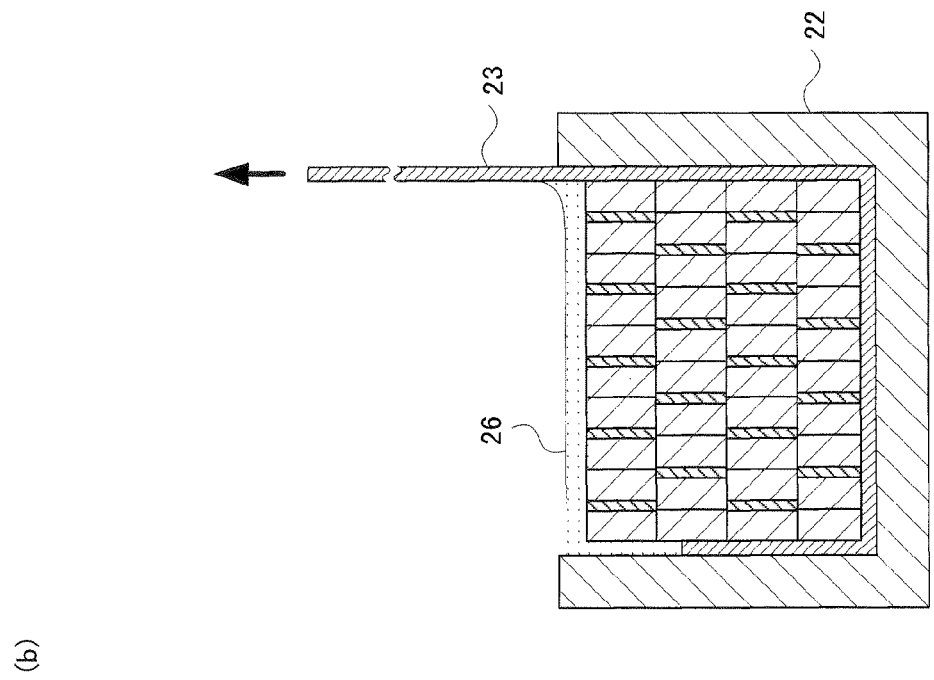
FIG. 13 is a sectional view showing a method of manufacturing the radiation detector according to Embodiment 2.
Figure 13:
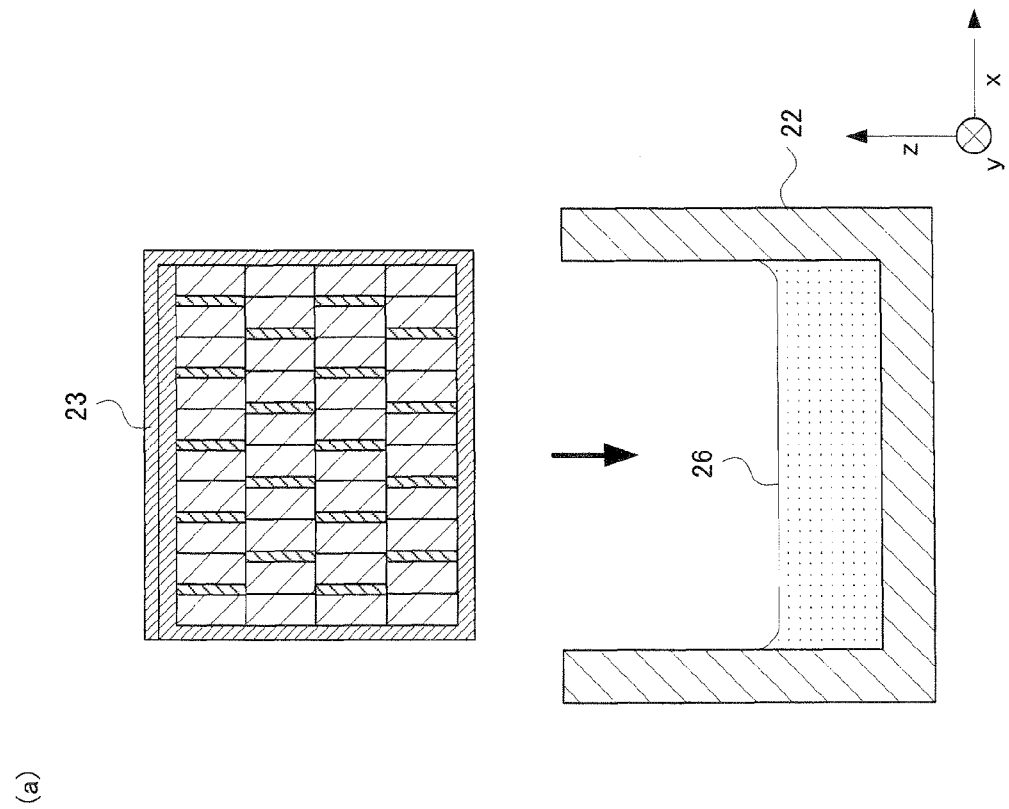
Figure 14:
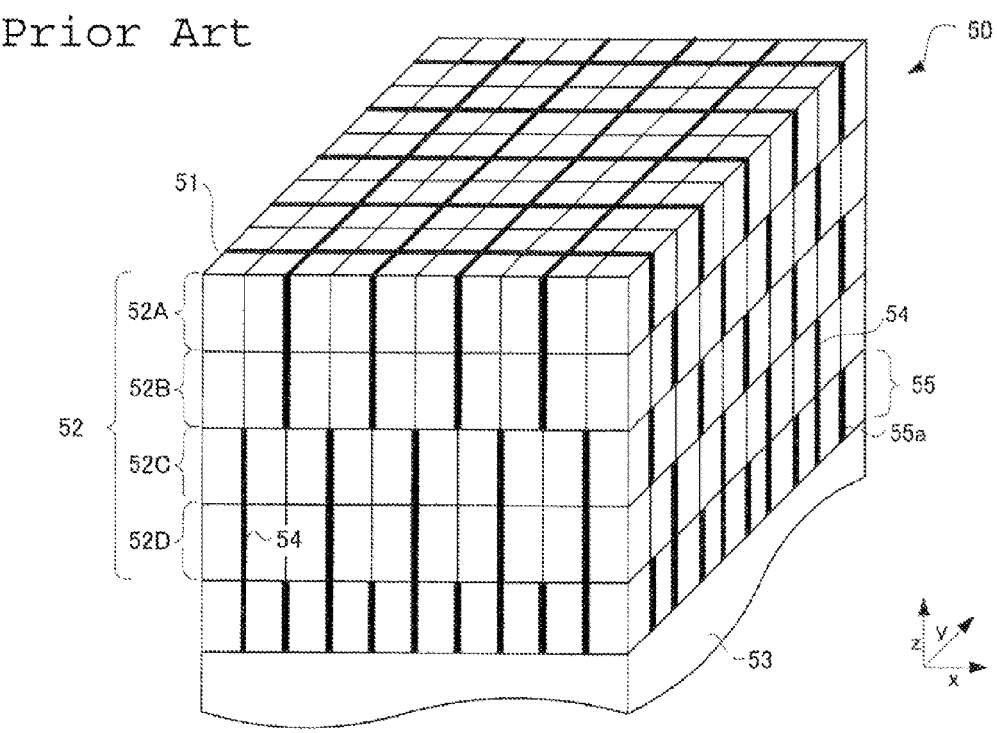
FIG. 14 is a sectional view showing a method of manufacturing the conventional light guide.

Next, description will be given to a method of manufacturing a radiation detector as Embodiment 2. FIGS. 12 and 13 are perspective views each showing a method of manufacturing a radiation detector according to Embodiment 2.

<Scintillator Manufacturing Step>

First, in order to manufacture a radiation detector 1 of the construction described in Embodiment 1, scintillation counter crystals are arranged in two dimensions to form a scintillation counter crystal layer. Specifically, first reflectors r and second reflectors s are assembled to form a reflector lattice frame 21. A container 22 is prepared having a recess 22a that allows accommodation of the reflector lattice frame 21. As shown in FIG. 12(a), the recess 22a is laid with a film 23, and then the reflector lattice frame 21a is placed thereon. Thereafter, the scintillation counter crystal 24 is inserted after another in each section divided by the reflector lattice frame 21a, whereby a single scintillation counter crystal layer 2A is formed. Here in FIG. 12, the number of the reflectors that constitute the reflector lattice frame 21 is omitted. Likewise, the number of the reflectors is to be omitted in the subsequent drawings. FIGS. 12 and 13 are sectional views in a zx-plane. Embodiment 2 has a similar yz-plane in its sectional view.

A further reflector lattice frame 21b is placed on the scintillation counter crystal layer 2A, and thereafter, the scintillation counter crystal 24 is inserted in each section divided by the reflector lattice frame 21b, whereby a single scintillation counter crystal layer 2B is formed. Thus, a scintillation counter crystal layer is successively formed after another, whereby four scintillation counter crystal layers 2A, 2B, 2C, and 2D, for example, are formed inside the recess 22a. As noted above, the scintillation counter crystals are arranged in three dimensions, as shown in FIG. 12(b).

Next, as shown in FIG. 13(a), the both ends of the film 23 are folded toward inside of the container 22 for enclosing the counter crystal layers 2A, 2B, 2C, and 2D. Thereafter, the whole film 23 is pulled out from the recess 22a. A release agent is applied inside of the recess 22a, and then a degassed thermosetting resin 26 is poured into the recess 22a of the container 22. Next, as shown in FIG. 13(a), a group of the scintillation counter crystals enclosed the film 23 is again inserted into the recess 22a, and goes down with the thermosetting resin 26. Thereafter, folding of the film 23 is cancelled, and the end of the film 23 is pulled as shown in FIG. 13(b) for pulling out the film 23 from recess 22a. Accordingly, the recess 22a has the group of the scintillation counter crystals remained therein that is sunk in the thermosetting resin 26. Subsequently, the thermosetting resin 26 is cured and the group of the scintillation counter crystals is pulled out, whereby a scintillator 2 may be obtained in which the scintillation counter crystals are arranged in three dimensions. Here, the scintillator 2 has a hardened solid resin interposed between the adjacent scintillation counter crystals, which corresponds to the foregoing the transparent material t.

<Lamination Step and Fluorescence Detector Coupling Step>

Next, the light guide 4 according to Embodiment 1 is adhered to the completed scintillator 2 with an adhesive, thereby realizing lamination thereof in the z-direction and optical coupling of the scintillator 2 and the light guide 4. Here, each of resin blocks 4c in the light guide 4 and each of the scintillation counter crystals d in the scintillator are combined by one to one. Finally, a fluorescence detection surface of the PMT 3 is adhered to the light guide 4 with the adhesive, thereby realizing lamination thereof in the z-direction and optical coupling to the light guide 4. Through the step, the light guide 4 allows to pass on fluorescence generated from the scintillator 2 to the PMT 3. As mentioned above, the radiation detector according to Embodiment 2 is completed. Here, the z-direction corresponds to the given direction in this invention.

With the method of manufacturing the radiation detector according to Embodiment 2 as mentioned above, the radiation detector may be manufactured with no grinding process performed to the light guide 4. The surface of the light guide 4 contacting the close end face 7b and that contacting the shaping member 9 are flat at the time when separating of the burr is completed. Consequently, the light guide 4 may be incorporated into the radiation detector by merely grinding the both surfaces of the light guide 4. Therefore, with the method of manufacturing the radiation detector according to Embodiment 2, a complicated grinding process in the light guide manufacturing step is shortened, which results in improved manufacture efficiency of the radiation detector and provision of a radiation detector of low price.

This invention is not limited to the foregoing embodiments, but may be modified as follows.

(1) In each of the foregoing embodiments, the scintillation counter crystal is composed of LYSO. Alternatively, the scintillation counter crystal may be composed of other materials, such as GSO ($Gd_2SiO_5$), which may be used in this invention. According to this modification, a method of manufacturing a radiation detector may be provided that allows provision of a radiation detector of low price.

(2) In each of the foregoing embodiments, the scintillator 2 has four scintillation counter crystal layers. This invention is not limited to this embodiment. For instance, the scintillator formed of one scintillation counter crystal layer may be applied to this invention. Moreover, the scintillation counter crystal layer may be freely adjusted in number depending on applications of the radiation detector.

(3) The fluorescence detector in each of the foregoing embodiments is formed of the PMT. This invention is not limited to this embodiment. A photodiode or an avalanche photodiode, etc. may be used instead of the PMT.

(4) In each of the foregoing embodiments, the first plate and the second plate are formed of a reflector that reflects fluorescence. This invention is not limited to this embodiment. A material of the first plate may be selected from one of a material that reflects light, a material that absorbs light, and a material that transmits light. Likewise, a material of the second plate may be selected from one of a material that reflects light, a material that absorbs light, and a material that transmits light. According to this modification, the first plate and the second plate may freely vary in material depending on applications of the radiation detector.

INDUSTRIAL UTILITY

As described above, this invention is suitable for a radiation detector for use in a medical field.

The invention claimed is:

1. A method of manufacturing a light guide provided in a radiation detector and allowing fluorescence to pass through, comprising:
    forming a lattice-like plate frame by fitting two or more first plates that extend along a first direction while being arranged in a second direction perpendicular to the first direction with two or more second plates that extend along the second direction while being arranged in the first direction for integration;
    inserting the plate frame into an aperture of a molding frame in a vertical direction;
    pouring a hardening resin prior to hardening to the aperture;
    placing a shaping member with a planar bottom face on the aperture of the molding frame, thereby covering a liquid surface of the hardening resin with which the aperture is filled with the bottom face for making the liquid surface flat, and flooding out a part of the hardening resin from the aperture to form a bulge for covering a side edge in the bottom face of the shaping member;
    hardening the hardening resin with which the aperture is filled to form a light guide with a hardened solid resin embedded in the plate frame, and hardening the bulge to form a burr composed of the solid resin and connecting with the light guide, thereby integrating the light guide with the shaping member;
    releasing the light guide from the molding frame by lifting the shaping member and the integrated light guide upward in the vertical direction simultaneously; and
    separating the burr from the light guide to cancel the connection of the light guide and the shaping member.

2. The method of manufacturing the light guide according to claim 1, wherein a material of the first plate is selected from one of a material that reflects light, a material that absorbs light, and a material that transmits light.

3. The method of manufacturing; the light guide according to claim 1, wherein a material of the second plate is selected from one of a material that reflects light, a material that absorbs light, and a material that transmits light.

4. The method of manufacturing the light guide according to claim 1, wherein two or more grooves are formed along the vertical direction between each of the first plates and each of the second plates, and
    the step of forming the plate frame comprises fitting the grooves in the first plates with the grooves in the second plates for forming the plate frame.

5. The method of manufacturing the light guide according to claim 1, wherein the shaping member has a taper portion at the side end thereof having a thickness decreasing from the bottom face in the vertical direction so as to be adjacent to the side edge of the bottom face.

6. A method of manufacturing radiation detector with the light guide according to claim 1, comprising the steps of:
    manufacturing a scintillator by arranging scintillation counter crystals that convert radiation into fluorescence in three dimensions;
    laminating the scintillator and the light guide in a given direction and coupled to each other; and
    coupling the light guide and a fluorescence detector that detects fluorescence in the given direction.

7. The method of manufacturing the light guide according to claim 2, wherein the shaping member has a taper portion at the side end thereof having a thickness decreasing from the bottom face in the vertical direction so as to be adjacent to the side edge of the bottom face.

8. The method of manufacturing the light guide according to claim 3, wherein the shaping member has a taper portion at the side end thereof having a thickness decreasing from the bottom face in the vertical direction so as to be adjacent to the side edge of the bottom face.

9. The method of manufacturing the light guide according to claim 4, wherein the shaping member has a taper portion at the side end thereof having a thickness decreasing from the bottom face in the vertical direction so as to be adjacent to the side edge of the bottom face.

10. A method of manufacturing radiation detector with the light guide according to claim 2, comprising the steps of:
    manufacturing a scintillator by arranging scintillation counter crystals that convert radiation into fluorescence in three dimensions;
    laminating the scintillator and the light guide in a given direction and coupled to each other; and
    coupling the light guide and a fluorescence detector that detects fluorescence in the given direction.

11. A method of manufacturing radiation detector with the light guide according to claim 3, comprising the steps of
    manufacturing a scintillator by arranging scintillation counter crystals that convert radiation into fluorescence in three dimensions;
    laminating the scintillator and the light guide in a given direction and coupled to each other; and
    coupling the light guide and a fluorescence detector that detects fluorescence in the given direction.

12. A method of manufacturing radiation detector with the light guide according to claim 4, comprising the steps of:

manufacturing a scintillator by arranging scintillation counter crystals that convert radiation into fluorescence in three dimensions;

laminating the scintillator and the light guide in a given direction and coupled to each other; and coupling the light guide and a fluorescence detector that detects fluorescence in the given direction.

13. A method of manufacturing radiation detector with the light guide according to claim 5, comprising the steps of:

manufacturing a scintillator by arranging scintillation counter crystals that convert radiation into fluorescence in three dimensions;

laminating the scintillator and the light guide in a given direction and coupled to each other; and coupling the light guide and a fluorescence detector that detects fluorescence in the given direction.

14. A method of manufacturing radiation detector with the light guide according to claim 7, comprising the steps of:

manufacturing a scintillator by arranging scintillation counter crystals that convert radiation into fluorescence in three dimensions;

laminating the scintillator and the light guide in a given direction and coupled to each other; and coupling the light guide and a fluorescence detector that detects fluorescence in the given direction.

15. A method of manufacturing radiation detector with the light guide according to claim 8, comprising the steps of:

manufacturing a scintillator by arranging scintillation counter crystals that convert radiation into fluorescence in three dimensions;

laminating the scintillator and the light guide in a given direction and coupled to each other; and cling light guide and a fluorescence detector that detects fluorescence in the given direction.

16. A method of manufacturing radiation detector with the light guide according to claim 9, comprising the steps of:

manufacturing a scintillator by arranging scintillation counter crystals that convert radiation into fluorescence in three dimensions;

laminating the scintillator and the light guide in a given direction and coupled to each other; and coupling the light guide and a fluorescence detector that detects fluorescence in the given direction.

\* \* \* \* \*